United States Patent [19]

Grupp

[11] Patent Number: 4,923,286
[45] Date of Patent: May 8, 1990

[54] DISPLAY CELL

[75] Inventor: Joachim Grupp, Peseux, Switzerland

[73] Assignee: Asulab S.A., Bienne, Switzerland

[21] Appl. No.: 271,408

[22] Filed: Nov. 14, 1988

Related U.S. Application Data

[63] Continuation of Ser. No. 19,391, Feb. 26, 1987, abandoned.

[30] Foreign Application Priority Data

Feb. 27, 1986 [CH] Switzerland .................... 00791/86

[51] Int. Cl.⁵ ............................................. G02F 1/13
[52] U.S. Cl. .................................. 350/340; 350/341; 350/346; 350/347 E
[58] Field of Search ............... 350/338, 340, 341, 346, 350/347 E, 343

[56] References Cited

U.S. PATENT DOCUMENTS

| | | |
|---|---|---|
| 3,756,694 | 9/1973 | Soree et al. . |
| 3,814,501 | 6/1974 | Schindler ............................ 350/338 |
| 3,837,729 | 9/1974 | Harsch ................................ 350/338 |
| 3,878,537 | 4/1975 | Roncillat et al. ............ 350/347 E X |
| 3,912,369 | 10/1975 | Kashnow ........................ 350/340 X |
| 4,042,294 | 8/1977 | Billings et al. ........................ 350/338 |
| 4,114,990 | 9/1978 | Mash et al. ........................... 350/341 |
| 4,213,676 | 7/1980 | Kaufmann ........................... 350/338 |
| 4,250,503 | 2/1981 | Shanks ........................... 350/332 X |
| 4,357,374 | 11/1982 | Ogawa ................................. 350/340 |
| 4,418,102 | 11/1983 | Ferrato ................................ 350/343 |
| 4,418,987 | 12/1983 | Takanashi et al. . |
| 4,427,978 | 1/1984 | Williams ........................ 350/333 X |
| 4,564,266 | 1/1986 | Durand et al. ...................... 350/332 |
| 4,566,758 | 1/1986 | Bos ....................................... 350/346 |
| 4,634,229 | 1/1987 | Amstutz .............................. 350/346 |
| 4,697,884 | 10/1987 | Amstutz et al. .................... 350/346 |

FOREIGN PATENT DOCUMENTS

| | | |
|---|---|---|
| 0131216 | 1/1985 | European Pat. Off. . |
| 2152757 | 4/1973 | France . |
| 1506570 | 4/1978 | United Kingdom ................ 350/340 |
| 2023865 | 1/1980 | United Kingdom . |

OTHER PUBLICATIONS

K. Metz, "Matrix Addressing of Nonemissive Displays", *Nonemissive Electrooptic Displays*, pp. 261–287, Plenum Press, 1975.
Patents Abstracts of Japan, vol. 4, No. 118 (P-24) [600], 22 aout 1980; and JP-A-55 73 023 (Suwa Seikosha K.K.)-*En entier*.
Patents Abstracts of Japan, vol. 4, No. 184 (P-41) [666], 18 decembre 1980; & JP-A-55 127 519 (Suwa Seikosha K.K.)-*En entier*.
Patents Abstracts of Japan, vol. 8, No. 175 (P-204) [1612], 11 aout 1984; & JP-A-59 69 735 (Seikoushiya)-*En entier*.
SID 1984, Digest of Technical Papers, vol. 15, p. 206.
SID 1985, Digest of Technical Papers, vol. 16, p. 278.
Journal of Applied Physics, vol. 47, Sep. 1976, pp. 3842–3845.
Mol. Cryst. Liq. Cryst. 1985, vol. 122, pp. 297–308, by F. C. Saunders et al.

*Primary Examiner*—Stanley D. Miller
*Assistant Examiner*—Anita Pellman Gross
*Attorney, Agent, or Firm*—Pollock, Vande Sande & Priddy

[57] ABSTRACT

The described cell comprises a mixture of liquid crystals (26), polarizers (28, 30) and alignment layers (22,24). The liquid crystals mixture includes a chiralic compound which induces a helical structure having a pitch greater than or equal to the thickness of the liquid crystal layer. One alignment layer (24) induces a planar alignment, the other (22) induces a hemeotropic alignment. This cell, of low cost, requires low control voltage and provides a very good contrast and a high multiplexing rate. It may be used to advantage in the manufacture of dots matrix display watches.

25 Claims, 4 Drawing Sheets

DISPLAY CELL

This application is a continuation of application Ser. No. 019,391, filed Feb. 26, 1987, now abandoned.

FIELD OF THE INVENTION

This invention relates to a multiplexable liquid crystal display (LCD) cell. This cell comprises in particular a pair of plane and parallel plates, one to the front the other at the rear, a frame located between these plates and defining a chamber in conjunction with the inner surfaces of the plates, a mixture of liquid crystals and of a chiralic compound accommodated in the chamber, a pair of control electrode networks each applied to one of the inner surfaces, and a pair of alignment layers respectively covering the inner surfaces. The cell further comprises either one polarizer extending parallel to the surfaces, in front of the front plate, and reflecting and diffusing means located at the back of the alignment layer and covering the rear plate, or two polarizers located on the outer surfaces of the two plates. A cell of this kind is described in French Patent Specification 2 549 268. Such cells are referred to as SBE (Supertwist Birefringence Effect) cells.

With this kind of cell it is possible to achieve a multiplexable display at a rate that may exceed 100, as the light that is transmitted in dependence on the electric field being applied is at first virtually constant and then changes abruptly, increasing or decreasing depending on the relative orientation of the polarizers and of the alignment layers. Also, the applied voltage is very weak. Moreover, this kind of cell provides a chromatic contrast and a particularly wide viewing angle. This is attributable to the fact that the liquid crystals mixture has a helical structure having a pitch equal or greater than the distance between the plates and that, in the absence of an electric field, the molecules close to the plates together form with the latter a tilt angle of about 25°. This particular structure hardly varies within a wide electric field range and then abruptly when this field reaches a critical value, the molecules in the central part of the space between the two plates reposition themselves to form an angle verging on 90° with respect to the surface of the plates.

This kind of cell is particularly sensitive to the orientation of the molecules. A variation in this orientation noticeably changes the colour and transparency of the cell. Thus, for the cell to have a uniform appearance, the alignment layers must induce an alignment such that the molecules be as parallel to each other as possible.

PRIOR ART

The method most frequently used nowadays in laboratories to achieve an alignment having a tilt angle of about 25° consists in depositing silicon monoxide (SiO) with a very flat angle of incidence (approximately 5°), the SiO particles being projected with a steady angle of incidence over the entire surface of the plates having to be treated. To ensure parallelism of the molecules, the angle of aperture of the particle beam must be kept as small as possible (about 0.2°). This involves very high costs, thus rendering this method unsuitable for mass production. So far, therefore, this kind of cell has found only limited outlets.

It is known to produce alignment layers with organic materials that induce an alignment very close to the vertical or the horizontal. The methods and materials will be described further. It is also known to produce plane alignment layers in which the molecules are approximately parallel to the plates by depositing SiO at an oblique angle (approximately 30° with respect to the plane of the plate).

It is further known to produce cells wherein the molecules of the liquid crystals mixture they contain are positioned, when close to one plate, in a direction parallel to the latter, and when close to the other plate in a perpendicular position. Whenever the molecules are not perfectly parallel and/or perpendicular to the plates the term "tilted hybrid alignment" is used.

A cell of this kind is described in SID 1984, Digest of Technical Papers, Volume 15, page 206. This cell, known as PCGH (Phase Change Guest Host), contains a mixture of nematic liquid crystals, of chiralic compound and of dichroic molecules. The concentration of the chiralic compound is such that it induces a pitch slightly smaller than the distance between the plates. More precisely, the ratio between thickness d and pitch p ranges from 1.02 to 1.52.

A similar kind of cell is described in SID 1985, Digest of Technical Papers, Volume 16, page 278. It differs from the cell decribed above only in that the d/p ratio ranges from 1.6 to 2.

This kind of cell provides a good viewing angle but a relatively poor contrast due to the dichroique mode. It cannot be used with conventional multiplexed addressing because of its very extended range.

Another family of cells having a hybrid alignment is known as HAN (Hybrid Aligned Nematic). A cell of this kind is described in the Journal of Applied Physics, Volume 47, September 1976, pages 3842 to 3845. This cell contains a mixture of nematic liquid crystals between a pair of plates whose inner surfaces are coated, one with a layer inducing planar alignment, the other with a layer inducing homeotropic alignment. Two polarizers, directed perpendicularly to one another, are respectively located at the front and rear of the cell. This cell operates in a birefringence controlled by an electric field. The physical characteristics of this cell are such that the variation in transmission and colour in dependence on the electric field provides a very flat electro-optical transmission curve.

This feature enables the production of cells able to display many shades of colour. On the other hand, they are in no way suited to conventional multiplexed addressing.

SUMMARY OF THE INVENTION

An object of the invention is to provide an LCD cell having characteristics similar to those of SBE cells but of appreciably lower price. This is achieved by arranging for one of the alignment layers to so orient the molecules of the mixture with which it is in contact that their optical axes form an angle less than or equal to 10° with the plane of the adjacent plate and by arranging for the other alignment layer to so orient the molecules in contact therewith that their optical axes form an angle less than or equal to 10° with an axis perpendicular to the plane of the adjacent plate.

The operation of this kind of cell is similar to that of SBE cells since the molecules have two structures that are very different from each other according to whether the electric field is slightly below or slightly above a critical value.

But the cost may be substantially reduced by resorting to simpler and less expensive techniques.

BRIEF DESCRIPTION OF THE DRAWINGS

In the accompanying diagrammatic drawings given by way of example.

In these figures, corresponding parts bear the same references.

DETAILED DESCRIPTION

Figure 1:
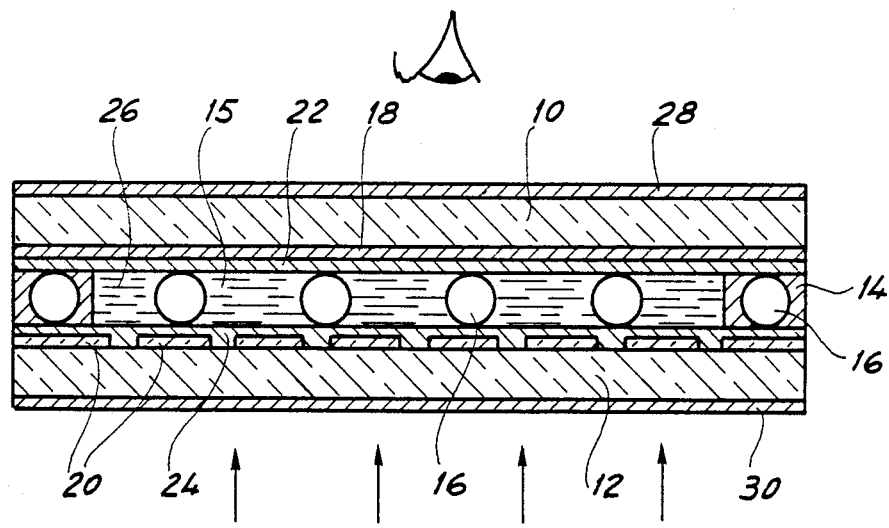
FIG. 1 is a cross-section of an LCD cell according to the invention, arranged to operate in the transmissive mode.
Figure 2:
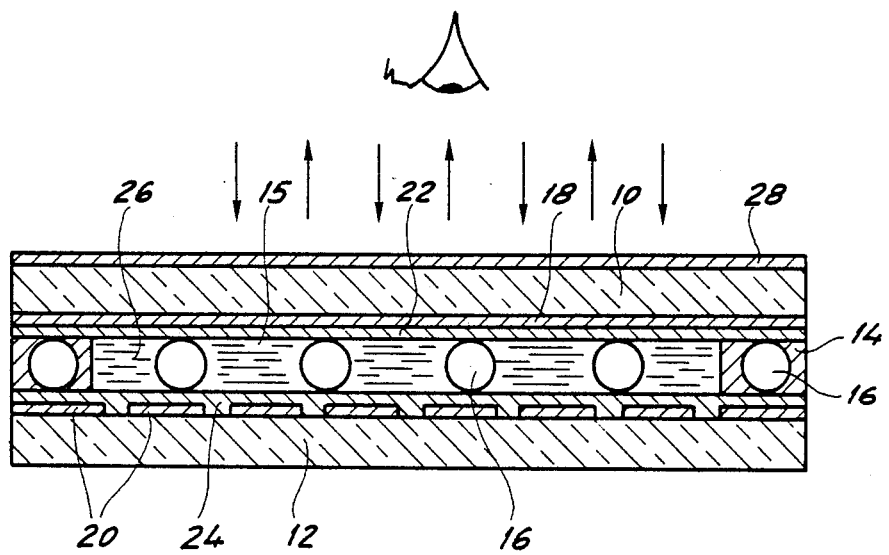
FIG. 2 is a cross-section of a cell according to the invention, arranged to operate in the reflective mode.

The display cells shown in FIGS. 1 and 2 are respectively arranged to operate in the transmissive and in the reflective mode. They both comprise a front glass plate 10 and a rear glass plate 12, spaced apart by a frame 14 to define a chamber 15. The frame is best made of epoxy glue. The distance between the plates is set by glass fibres 16 evenly distributed in the space between the plates, both within chamber 15 and within the glue of frame 14. A network of conductive tracks 18 and 20 is provided on the inner surfaces of each of plates 10 and 12. Network 18 is transparent and is best made of doped indium oxide. Network 20 has a different composition, depending on whether the cell is meant to operate in a transmissive or in a reflective mode. Networks 18 and 20 are orthogonal and define a matrix of dots for the display of information. The inner surfaces of plates 10 and 12, and their conductive tracks are coated with alignment layers 22 and 24, respectively. These alignment layers are best made with organic materials, whose composition and characteristics are set forth below in more detail. Chamber 15 is filled with a liquid crystals mixture 26, the composition of which is also described below.

The cell in FIG. 1, which is meant to operate in the transmissive mode, further comprises polarizers 28 and 30 located respectively on the top of the front plate 10 and at the bottom of the rear plate 12. Here, the network of conductive tracks 20, which must be transparent, is also best made of doped indium oxide.

The cell in FIG. 2, which operates in the reflective mode, comprises only one polarizer, 28, and the network of conductive tracks 20 is here not made of a transparent material but of an opaque, reflective and diffusive material, e.g. a frosted film of aluminium. Thus, light entering the display cell is reflected to the front to enable reading by reflection.

In these cells, alignment layer 24 is made of rubbed polyimide which induces planar alignment in a common direction of the molecules of the mixture in its vicinity, the liquid crystal molecules being virtually parallel to the plates. More particularly, the angle of inclination of the molecules with respect to the plates is about 2°.

This alignment layer could also be produced by depositing a layer of SiO with an oblique incidence (30°). The angle of inclination of the molecules would also be about 1°.

Alignment layer 22 is also made of an organic material. The latter is so chosen that the structure of the liquid crystal molecules in its vicinity is of a homeotropic type. This can be achieved with e.g. Dimethyloctadecyl-aminopropyltrimethoxylane (the usual abreviation of which is DMOAP) or Octadecyltriethoxylane (the usual abreviation of which is ODS).

The liquid crystals mixture may be made from a product sold under the reference ZLI 1612 by Merck of the FRG, which exhibits a positive dielectric anisotropy, with an addition of CB 15 sold by BDH of the UK.

Figures 3, 5:
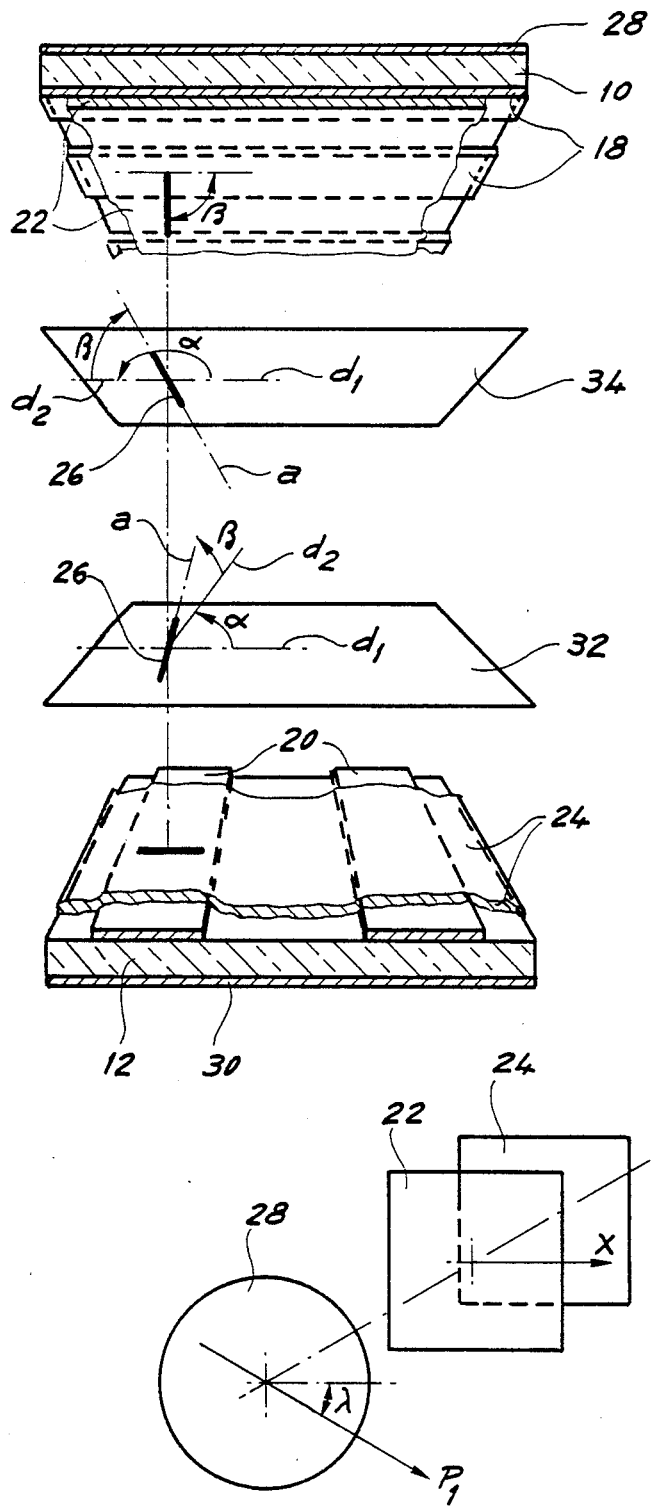
FIG. 3 is an exploded cross-sectional view in perspective of a cell similar to that of FIG. 1, showing the orientation of some liquid crystal molecules in the absence of an electric field.
FIG. 5 illustrates, schematically and in perspective, the structure of a cell similar to that of FIG. 1, and shows more particularly the way in which the liquid crystal molecules and the polarizers are oriented with respect to each other.
Figure 4A:
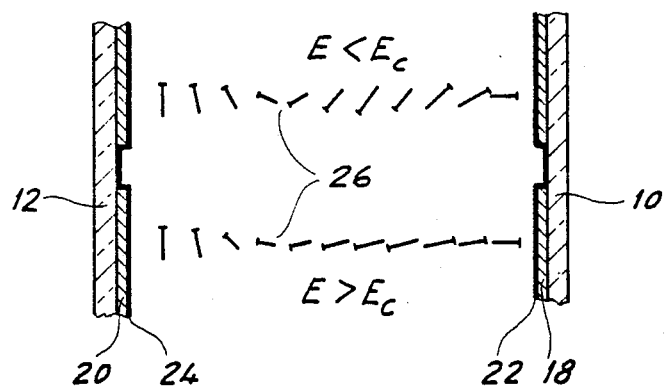
FIG. 4a is another exploded cross-sectional view of a cell schematically showing two sets of molecules in the presence of a subcritical and an overcritical electric field.

For a better understanding of the operation of the cell, reference should be made to FIGS. 3 and 4a, which show schematically parts of a cell according to the invention, meant to operate in the transmissive mode.

FIG. 3 shows glass plates 10 and 12, conductive tracks 18 and 20, alignment layers 22 and 24, polarizers 28 and 30 and the liquid crystal molecules contained in mixture 26. These molecules are schematically represented by cylinders having rounded ends, with the axis of the cylinders corresponding to the optical axis of the molecules. In order better to understand the structure of the cell, two intermediate projection planes 32, 34 are shown, respectively positioned at one third and two thirds of the thickness of the cell. As mentioned earlier, alignment layer 24 induces a planar alignment of the molecules of the mixture located in its vicinity, while alignment layer 22 induces a homeotropic alignment.

With no electric field or a field below a critical value and due to the alignment layers and the presence of a chiralic compound in the mixture, the molecules are arranged according to a composite structure combining a helical structure with a structure induced by a hybrid alignment.

The orientation of the molecules can be defined by two angles $\alpha$ and $\beta$, as shown in FIG. 3. In order to define the angles associated with a molecule, a plane is drawn parallel to the plane of the plates, through the centre of the molecule. This plane involves a first straight line $d_1$ that is parallel to the planar alignment direction and a second straight line $d_2$ obtained by projecting the axis a of the molecule into the plane. Angle $\alpha$ is defined by straight lines $d_1$ and $d_2$ and angle $\beta$ is defined by straight line $d_2$ and axis a.

In FIG. 4a the molecules of mixture 26 are shown projected onto the cross-sectional plane of the figure and are depicted as nails, with their heads facing the observer. The upper part shows the structure of the cell when the applied field has a value less than the critical value, and the lower part shows the structure of the cell when the applied field has a value greater than the critical value. As shown in the figure, the molecules are arranged according to a helical structure with respect to an axis perpendicular to plates 10 and 12, each molecule being moreover tilted with respect to the axis with an angle which varies progressively from zero near plate 10 to 90° near plate 12.

When the applied field has a value exceeding the critical value, as is depicted by the lower part of FIG. 4a, the molecules have a greater angle of inclination relative to the plane of rear plate 12 but keep their helical alignment. In other words, the molecules tend to line up with the direction of the electric field.

For a better understanding of the way in which the molecules are arranged, reference will now be made to FIGS. 4b and 4c which show graphically how $\alpha$ and $\beta$ vary with the distance of the molecules from rear plate 12. These curves are drawn in an empirical way for the sole purpose of explaining the principle of operation of the cell.

Figure 4B:
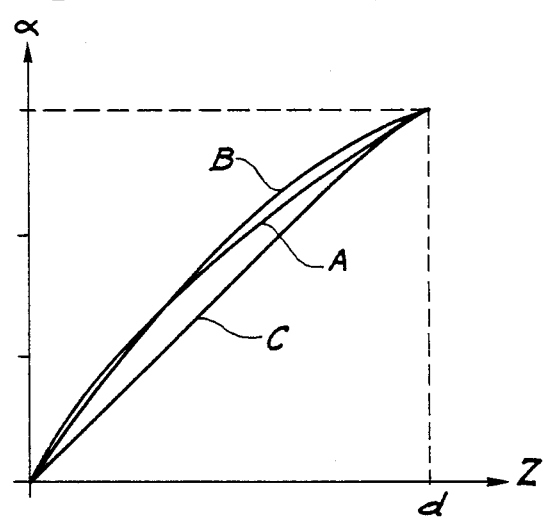
FIGS. 4b and 4c are graphs showing the change in orientation of the liquid crystal molecules depending on their position within the thickness of the layer.
Figure 4C:
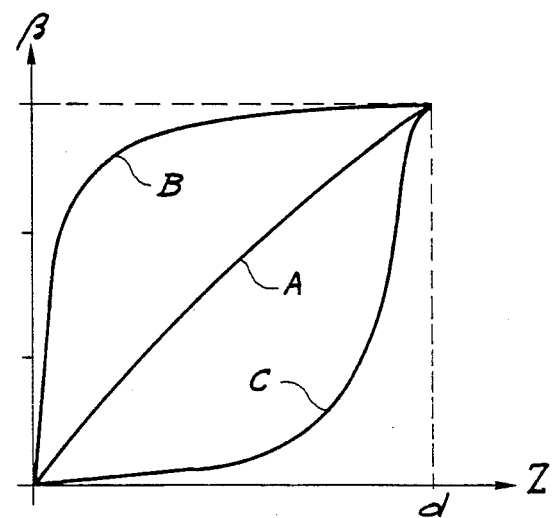

In FIGS. 4b and 4c, curves A respectively represent the variation of $\alpha$ and $\beta$ with distance from rear plate 12, in the presence of a subcritical applied electric field, with a liquid crystal mixture having a positive or negative dielectric anisotropy and curves B and C represent the variations of $\alpha$ and $\beta$ with distance from rear plate 12, in the presence of a overcritical electric field, with a liquid crystals mixture having a dielectric anisotropy that is respectively positive and negative.

As shown in FIG. 4b, angle $\alpha$ varies almost linearly from the rear plate 12 to the front plate 10. This angle is only slightly affected by the application of an electric field.

Such is not the case with angle $\beta$. Admittedly, with no electric field or a field below the critical value, angle $\beta$ varies in an almost linear fashion. In this case, the mean value of $\beta$ is 45°. But as soon as the applied field exceeds the critical value, the molecules tend to orient themselves parallel to the field when the liquid crystal has a positive dielectric anisotropy. This means that, for all values of Z other than 0 or d, the shape of B is curved such that $\beta$ always is greater than the corresponding value prevailing in the absence of an overcritical electric field (curve A). The mean value of $\beta$ is thus greater than 45°.

The behaviour of a liquid crystal having a negative dielectric anisotropy is depicted by curve C. The application of an overcritical electric field causes the curve to follow another direction, in such a way that the mean value of $\beta$ is less than 45°.

Considering the birefringent nature of the liquid crystal molecules, a change in their orientation modifies the characteristics of the polarized light when the latter travels through the mixture, as explained above.

To achieve maximum effect, the polarizer(s) must be accurately positioned with respect to the planar alignment layer. For a better understanding of this relative orientation of the polarizer(s) and of the planar alignment layer, reference is made to FIG. 5, showing polarizers 28 and 30 and alignment layers 22 and 24. The direction of alignment of planar alignment layer 24 is represented by an axis X, whereas the polarization directions of polarizers 28 and 30 are represented by axes P1 and P2. As shown in this figure, axes P1 and P2 form with axis X an angle $\lambda$ and an angle $\delta$ respectively.

Tests made to date have materialized in a number of constructional embodiments for the cell with interesting results. Three such embodiments will now be described.

Embodiment 1

In this cell, mixture 26 is made up of product ZLI 1612, a mixture of liquid crystals having a positive dielectric anisotropy, plus 1.19% of a chiralic compound known as CB 15. This chiralic compound induces clockwise rotation of the liquid crystal. This cell has, in the multiplexed mode, the following characteristics:

| | | |
|---|---|---|
| p | = | 11 μm |
| d | = | 8 μm |
| $U_{on}$ | = | 1.55 V |
| $U_{off}$ | = | 1.04 V |
| N | = | 7 |
| c | = | 34.5 |
| $\lambda$ | = | −27° |
| $\delta$ | = | −9° |

In the above table, p represents the pitch that is induced in the mixture by the chiralic compound in the absence of constraint, d is the distance between the plates, $U_{on}$ is the voltage at which the cell is at its darkest, $U_{off}$ is the voltage at which it is at its brightest, N is the optimal multiplexing ratio, i.e. that for which the contrast between the activated and de-activated areas is greatest, and c is the contrast obtained with a multiplexing ratio of N. This cell further has the following characteristics: the alignment layers are made of $SiO_x$. More precisely, planar alignment layer 24 is produced by applying SiO with an angle of incidence of 30° with respect to the two plates. This type of deposition enables virtually planar alignment as the molecules have at most an inclination of 1° with respect to the plates. The homeotropic alignment layer is produced also with $SiO_x$, but in this case the latter is applied with a grazing incidence, and by subjecting the plates to a rotary motion. This kind of deposition enables an alignment layer to be produced which induces a quasi-homeotropic structure, the angle between a perpendicular to the plates and the direction of alignment of the molecules being in the region of 1° to 3°.

Figure 6:
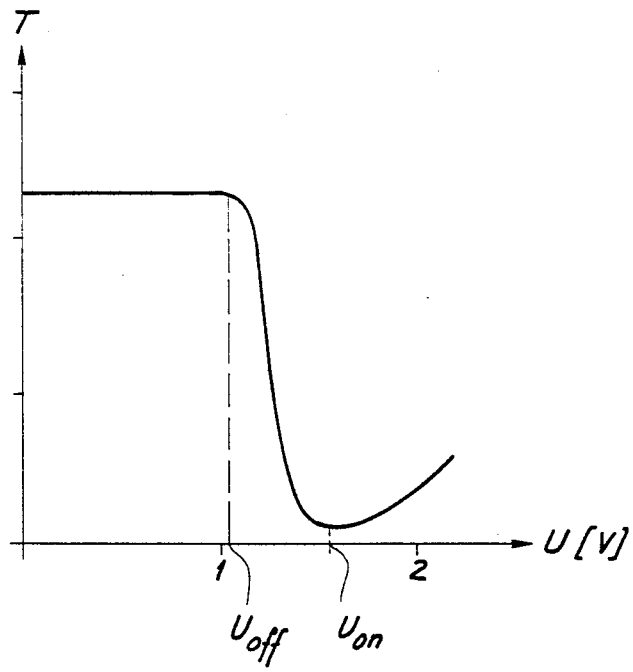
FIGS. 6 and 7 are graphs showing the transmission curves of three described examples of display cells.

FIG. 6 shows how transmission varies with the voltage applied across the cell's terminals. Transmission is measured across the whole visible spectrum, while adapting to the sensitivity of the eye, as is customary for this type of measurement.

The curve shown in FIG. 6 has three parts. In the first part, between 0 and about 1 V, transmission is at its best and is practically constant. In the second part, between 1 and 1.5 V, transmission drops abruptly to near 0. In the third part of the curve, with voltage greater than 1.5 V, transmission increases in a progressive manner. Only the first and second parts of this curve are of interest. The first part of the curve shows a virtually horizontal characteristic. This result, obtained by an empirical investigation, enables the production of a cell in which the areas that are not to be displayed, whether subjected or not to an electric field, have the same contrast. This characteristic is of interest where multiplexed cells are concerned because, in this type of cell, the non-displayed segments are permanently subjected to a non-zero electric field, referenced $U_{off}$. If the contrast is not identical to that generated in a region which is not subjected to an electric field, the non-displayed segments show a slight contrast with respect to the regions that are not subjected to an electric field, which proves unattractive.

Because of the third part of the curve, in which transmission increases progressively, this type of cell needs a supply voltage $U_{on}$ which should not exceed the value corresponding to the minimum of the transmission curve.

Tests made with planar or homeotropic alignment layers placed on the side of the cell through which light enters have shown similar characteristics as regards transmission. In other words, angles $\lambda$ and $\delta$ for which the contrast is optimal have identical values, whatever the position of the cell.

Embodiment 2

The second display cell is made using liquid crystal E7 with some chiralic compound CB 15, both supplied by BDH. The proportion of CB 15 is 1.76%. This cell has the following characteristics for a multiplexed mode:

| | | |
|---|---|---|
| p | = | 9.14 μm |
| d | = | 6.4 μm |
| $U_{on}$ | = | 1.3 V |
| $U_{off}$ | = | 0.88 V |
| N | = | 7 |
| c | = | 34 |
| $\lambda$ | = | 0° |
| $\delta$ | = | +24° |

In this cell, operating in the transmissive mode, the homeotropic alignment layer is located on the side through which light enters.

Figure 7:
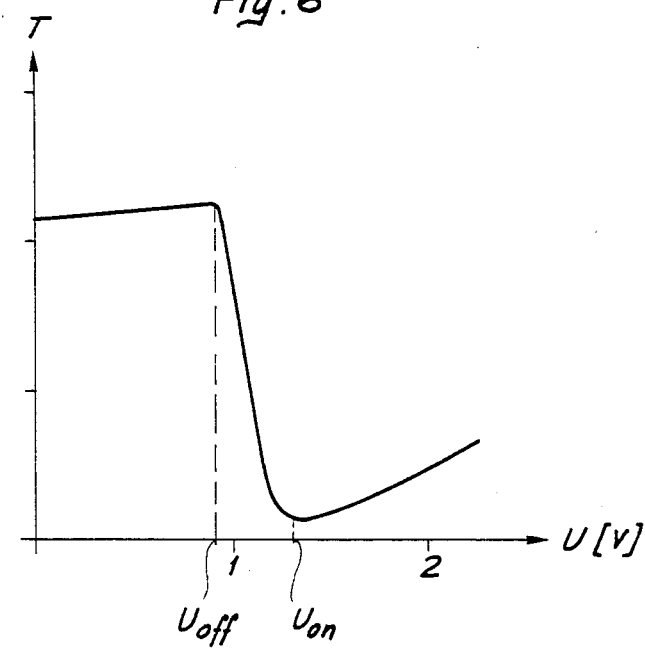

The planar alignment layer is made with polyimide deposited by conventional means involving inter alia centrifugation, then rubbed to define the direction of the alignment. This alignment layer further defines an alignment of molecules such that the latter form an angle of a few degrees with respect to the plates, this angle being constant over the whole surface. The homeotropic alignment layer is made with a solution containing mainly the compound DMOAP, deposited in a similar way to polyimide. The liquid crystal molecules have, with respect to such a homeotropic alignment layer, an almost perfect perpendicular orientation. The transmission curve, as a function of the applied voltage, is shown in FIG. 7. Its overall shape is very close to that of FIG. 6. It should however be noted that the first part of the curve is not as flat as that of the cell described earlier, transmission being slightly greater with voltage $U_{off}$ than with zero voltage.

Embodiment 3

The cell in this case has characteristics that are identical to those of the second cell, except for the orientation of the alignment layers, the planar alignment layer being here on the side through which light enters. This involved modifying the position of the polarizers with respect to the alignment layer. Angle $\lambda$ is here equal to $-4°$ and angle $\delta$ to $-28°$. The curve of transmission with respect to voltage is identical to that of the second cell and thus corresponds to FIG. 7.

In the three embodiments described, the cells are arranged to operate in a transmissive mode. They may of course also be arranged to operate in a reflective mode.

To produce such cells, two constructional forms may be adopted.

In the first constructional form, which corresponds to the cell described with reference to FIG. 2, the cell comprises only one polarizer, located at the front of the cell. This arrangement does not enable as great a contrast as that obtained with a cell operating in a transmissive mode. The reason is that, since the role played by the input and output polarizers is, in this case, being performed by one polarizer only, the orientation of the latter can only be a compromise.

In the second cionstructional form, the cell has two polarizers that are located and oriented in the same manner as in the transmissive cell of FIG. 1 with, in addition, reflective and diffusing means located at the back of the second polarizer. Here, the contrast is greater than with the cell having only one polarizer, but the luminosity is weaker. This is due to the fact that the light must go through a polarizer four times instead of twice as in the first constructional form.

As will be apparent from the above examples, a display cell can be provided which is able to achieve a multiplexing rate of up to 7, possibly even more, and which can be manufactured industrially at low cost.

So far, it has not been possible to establish the physical rules governing this kind of cell. Practical tests have shown however that satisfactory results could be obtained when the axes of the liquid crystal molecules form with the plates, in the vicinity of the latter, an angle of between 0° and 10°, with respect to the plane of the plate adjacent the planar alignment layer and a perpendicular to the plate adjacent the homeotropic alignment layer, the most advantageous range being between 3° and 6°, depending on the mixture used.

To achieve such alignments, it is known that the tilt angle obtained through deposition of polyimide and rubbing ranges from 0° and 6°, depending on the conditions under which the deposition, the polymerization and the rubbing are carried out. An alignment with a tilt angle of over 8° can also be achieved by depositing SiO with grazing incidence. These methods are well known to the man of the art.

To incline the molecules that are located near the plate bearing the homeotropic alignment layer, use can be made of the method described by F. C. Saunders et al. in Mol. Cryst. Liq. Cryst. 1985, Vol. 122, pages 297–308.

It seems that the polarization direction of the polarizer located adjacent the plate bearing the planar alignment layer best forms with the direction of alignment of the latter an angle of 0° to 15°, while the direction of alignment of the second polarizer for the transmissive mode best forms an angle of 20° to 30° with the direction of alignment of the planar alignment layer.

It is probable that the characteristics of the cell may be improved by adapting its thickness to the birefringence characteristics of the liquid crystal.

Display cells as described above may be made at low cost and yet be able to reach multiplexing rates close to 10 with a remarkably low supply voltage. Such characteristics predispose these cells to horological applications, e.g. to the making of dots matrix display watches. Moreover, the contrast is obtained by resorting to birefringence effects that enable chatoyant colours and hence some quite outstanding aesthetic effects to be achieved.

I claim:
1. A multiplexable, liquid crystals display cell comprising:
   a pair of plane and parallel plates, one at the front, the other at the rear;
   a frame located between the plates and defining with the latter a chamber;
   a mixture of liquid crystals and of a chiralic compound in said chamber, the amount of chiralic compound in said mixture being such as to impart to the liquid crystals a helical motion having a pitch p greater than or equal to the distance d between the plates;

a pair of control electrode networks, one on each plate and each comprising a plurality of conductive tracks, the conductive tracks of one being arranged in crossing relation to the conductive tracks of the other to define a pattern of areas for displaying information;

a pair of alignment layers respectively covering the inner surfaces of said plates;

a polarizer extending parallel to said surfaces, in front of the front plate; and, reflecting and diffusing means located at the back of the alignment layer covering the rear plate;

wherein one of the alignment layers is adapted to induce planar alignment of the molecules of the mixture and to so orient said molecules that their optical axes will form an angle not exceeding 10° with the plane of the plate adjacent this layer, wherein the other of said alignment layers is adapted to induce homeotropic alignment of the molecules of the mixture and to so orient said molecules that their optical axes will form an angle not exceeding 10° with an axis perpendicular to the plane of the plate adjacent said other layer, and wherein the optical transmission of the display cell is substantially constant for voltages below a predetermined critical voltage range and varies by a substantial amount within said predetermined critical voltage range.

2. A display cell as in claim 1, wherein said reflecting and diffusing means are located at the back of said rear plate and wherein it further comprises a polarizer between said rear plate and said reflecting and diffusing means.

3. A display cell as in claim 2, wherein the polarization directions of said polarizers relative to the direction of alignment of said planar alignment layer are selected to provide birefringence effect.

4. A display cell as in claim 1, wherein the polarization direction of said polarizer relative to the direction of alignment of said planar alignment layer is selected to provide birefringence effect.

5. A display cell as in claim 4, wherein said reflecting and diffusing means include a layer of opaque and diffusing material covering the inner surface of said rear plate.

6. A display cell as in claim 4, wherein d/p ranges from 0.5 to 1.

7. A display cell as in claim 4, wherein said liquid crystals mixture has a positive dielectric anisotropy.

8. A display cell as in claim 4, wherein, in the vicinity of the plate covered with the homeotropic alignment layer, said optical axes form an angle ranging from 1° to 6° with an axis perpendicular to the plane of said homeotropic layered plate; and wherein, in the vicinity of the plate covered with the planar alignment layer, said optical axes form an angle ranging from 0° to 10° with the plane of said planar layered plate.

9. A display cell as in claim 8, wherein, in the vicinity of the plate covered with the homeotropic alignment layer, said optical axis forms an angle ranging from 3° to 6° with an axis perpendicular to the plane of this plate.

10. A display cell as in claim 8, wherein, in the vicinity of the plate covered with the planar alignment layer, said optical axis forms an angle ranging from 3° to 6° with the plane of this plate.

11. A multiplexable, liquid crystals display cell comprising:

a pair of plane and parallel plates, one at the front, the other at the rear;

a frame located between the plates and defining with the latter a chamber;

a mixture of liquid crystals and of a chiralic compound in said chamber, the amount of chiralic compound in said mixture being such as to impart to the liquid crystals a helical motion having a pitch p greater than or equal to the distance d between the said plates;

a first network of transparent control electrodes on the front plate, said first network comprising a plurality of conductive tracks;

a second network of opaque control electrodes on the rear plate and acting as light reflecting and diffusing means, said second network comprising a plurality of conductive tracks, the conductive tracks of said first and second networks being arranged in crossing relation to each other to define a pattern of areas for displaying information;

a pair of alignment layers respectively covering the inner surfaces of said plates; and a polarizer extending parallel to said surfaces, in front of the fore plate;

wherein one of the alignment layers is adapted to induce planar alignment of the molecules of the mixture and to so orient said molecules that their optical axes will form an angle not exceeding 10° with the plane of the plate adjacent this layer, wherein the other of said alignment layers is adapted to induce homeotropic alignment of the molecules of the mixture and to so orient said molecules that their optical axes will form an angle not exceeding 10° with an axis perpendicular to the plane of the plate adjacent said other layer, and wherein the optical transmission of the display cell is substantially constant for voltages below a predetermined critical voltage range and varies by a substantial amount within said predetermined critical voltage range.

12. A display cell as in claim 11, wherein the polarization direction of said polarizer relative to the direction of alignment of said planar alignment layer is selected to provide birefringence effect.

13. A display cell as in claim 12, wherein d/p ranges from 0.5 to 1.

14. A display cell as in claim 12, wherein said liquid crystals mixture has a positive dielectric anisotropy.

15. A display cell as in claim 11, wherein, in the vicinity of the plate covered with the homeotropic alignment layer, said optical axes form an angle ranging from 1° to 6° with an axis perpendicular to the plane of said homeotropic layered plate; and wherein, in the vicinity of the plate covered with the planar alignment layer, said optical axes form an angle ranging from 0° to 10° with the plane of said planar layered plate.

16. A display cell as in claim 15, wherein, in the vicinity of the plate covered with the homeotropic alignment layer, said optical axis forms an angle ranging from 3° to 6° with an axis perpendicular to the plane of this plate.

17. A display cell as in claim 15, wherein, in the vicinity of the plate covered with the planar alignment layer, said optical axis forms an angle ranging from 3° to 6° with the plane of this plate.

18. A multiplexable, liquid crystals display cell comprising:

a pair of plane and parallel plates, one at the front, the other at the rear;

a frame located between the plates and defining with the latter a chamber;

a mixture of liquid crystals and of a chiralic compound in said chamber, the amount of chiralic compound in said mixture being such as to impart to the liquid crystals a helical motion having a pitch p greater than or equal to the distance d between said plates;

a pair of control electrode networks, one on each plate and each comprising a plurality of conductive tracks, the conductive tracks of one being arranged in crossing relation to the conductive tracks of the other to define a pattern of areas for displaying information;

a pair of alignment layers respectively covering the inner surfaces of said plates; and first and second polarizers extending parallel to said surfaces, one at the front of the front plate and the other at the back of the rear plate;

wherein one of the alignment layers is adapted to induce planar alignment of the molecules of the mixture and to so orient said molecules that their optical axes will form an angle not exceeding 10° with the plane of the plate adjacent this layer, wherein the other of said alignment layers is adapted to induce homeotropic alignment of the molecules of the mixture and to so orient said molecules that their optical axes will form an angle not exceeding 10° with an axis perpendicular to the plane of the plate adjacent said other layer, and wherein the optical transmission of the display cell is substantially constant for voltages below a predetermined critical voltage range and varies by a substantial amount within said predetermined critical voltage range.

19. A display cell as in claim 18, wherein the polarization directions of said polarizers relative to the direction of alignment of said planar alignment layer are selected to provide birefringence effect.

20. A display cell as in claim 19, wherein d/p ranges from 0.5 to 1.

21. A display cell as in claim 19, wherein said liquid crystals mixture has a positive dielectric anisotropy.

22. A display cell as in claim 19, wherein the direction of polarization of one of said polarizers forms an angle of 0° to 15° with the direction of alignment of said planar alignment layer, and wherein the direction of polarization of the other of said polarizers forms an angle of 20° to 30° with the direction of alignment of said planar alignment layer.

23. A display cell as in claim 18, wherein, in the vicinity of the plate covered with the homeotropic alignment layer, said optical axes form an angle ranging from 1° to 6° with an axis perpendicular to the plane of said homeotropic layered plate; and wherein, in the vicinity of the plate covered with the planar alignment layer, said optical axes form an angle ranging from 0° to 10° with the plane of said planar layered plate.

24. A display cell as in claim 23, wherein, in the vicinity of the plate covered with the homeotropic alignment layer, said optical axis forms an angle ranging from 3° to 6° with an axis perpendicular to the plane of this plate.

25. A display cell as in claim 23, wherein, in the vicinity of the plate covered with the planar alignment layer, said optical axis forms an angle ranging from 3° to 6° with the plane of this plate.

* * * * *